US007402925B2

(12) United States Patent  
Best et al.

(10) Patent No.: US 7,402,925 B2  
(45) Date of Patent: Jul. 22, 2008

(54) STATOR FOR AN ELECTRIC MOTOR HAVING A TEMPERATURE MONITOR

(75) Inventors: Dieter Best, Ingelfingen (DE); Rainer Zierlein, Igersheim (DE); Alexander Kinzel, Crailsheim (DE); Erich Fiedler, Neusitz (DE)

(73) Assignee: EBM-PAPST Mulfingen GmbH & Co KG, Bachmuhle (DE)

( * ) Notice: Subject to any disclaimer, the term of this patent is extended or adjusted under 35 U.S.C. 154(b) by 0 days.

(21) Appl. No.: 11/438,927

(22) Filed: May 23, 2006

(65) Prior Publication Data

US 2006/0262442 A1    Nov. 23, 2006

(30) Foreign Application Priority Data

May 23, 2005   (EP)   ................... 05104339

(51) Int. Cl.  
*H02K 3/50* (2006.01)  
*H02K 11/00* (2006.01)

(52) U.S. Cl. ................ 310/68 C; 310/71; 310/67 R

(58) Field of Classification Search .......... 310/68 B, 310/68 C, 67 R, 71, 91  
See application file for complete search history.

(56) References Cited

U.S. PATENT DOCUMENTS 4,090,099 A * 5/1978 Daffron ................... 310/168  
4,129,796 A 12/1978 Grundler et al.  
4,616,149 A * 10/1986 Best ........................ 310/71  
4,983,130 A * 1/1991 Caveney et al. ............. 439/407  
5,229,674 A * 7/1993 Best ........................ 310/71  
5,663,604 A 9/1997 Takahashi  
6,204,583 B1 3/2001 Sasaki et al.

FOREIGN PATENT DOCUMENTS

| DE | 26 26 539 | 12/1977 |
| DE | 27 12824 C2 | 3/1986 |
| DE | 39 05 773 A1 | 9/1990 |
| DE | 43 22 575 A1 | 1/1995 |
| DE | 36 29 049 C2 | 2/1998 |
| EP | 0 727 864 A2 | 1/1996 |
| EP | 0 933 095 B1 | 12/1998 |
| EP | 0 769 840 B | 12/2000 |
| EP | 1 134 876 B1 | 1/2001 |
| EP | 1 220 422 B1 | 10/2001 |
| JP | 10094222 A * | 4/1998 |

* cited by examiner

*Primary Examiner*—Karl I Tamai  
(74) *Attorney, Agent, or Firm*—Brinks Hofer Gilson & Lione

(57) ABSTRACT

A stator for an electric motor, in particular for an external rotor motor, includes a laminated stator core which is provided with a stator winding and having a connecting arrangement, which is arranged on one end side in the region of an end winding of the stator winding, for the purpose of electrically connecting winding wire ends of the stator winding and connecting wires of a temperature monitor connected upstream of the stator winding. The connecting arrangement has an insulating switching disk which covers the region of the end winding, in particular in the form of a cap. The temperature monitor is held in the switching disk in an integrated manner such that, on the end-winding side, it rests between the Mater winding and the switching disk such that it is in thermally conductive bearing contact with said stator winding.

12 Claims, 5 Drawing Sheets

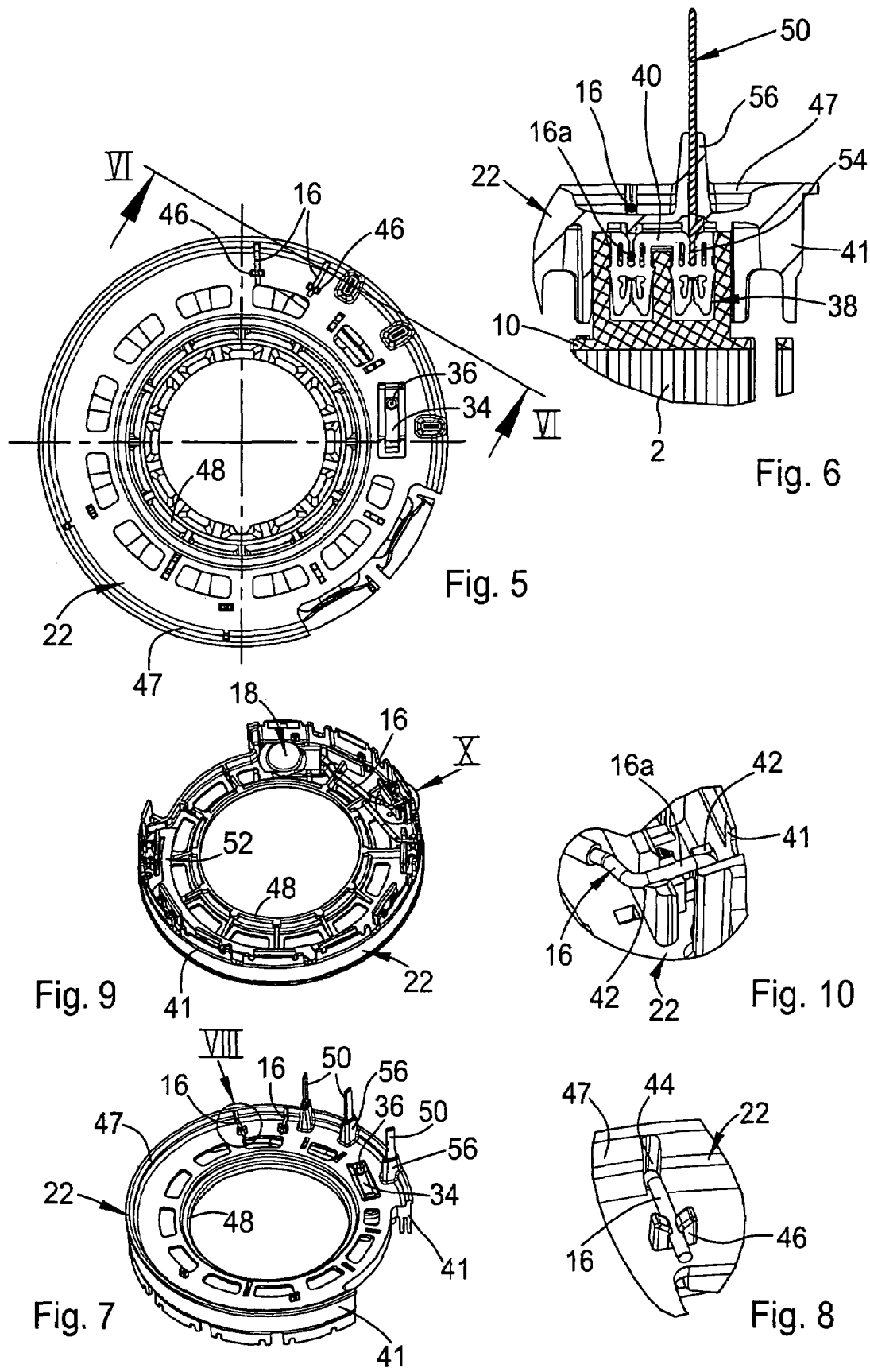

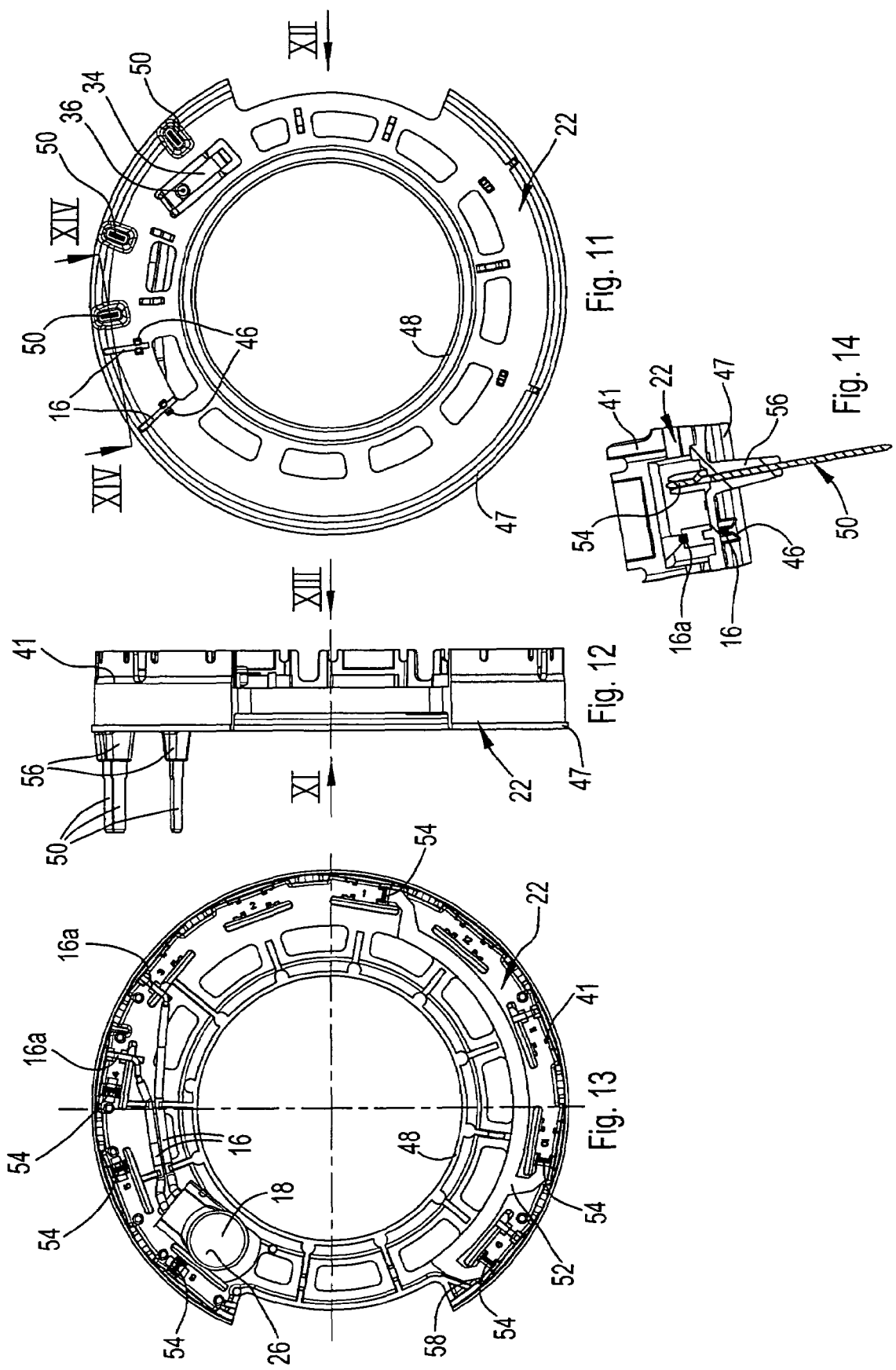

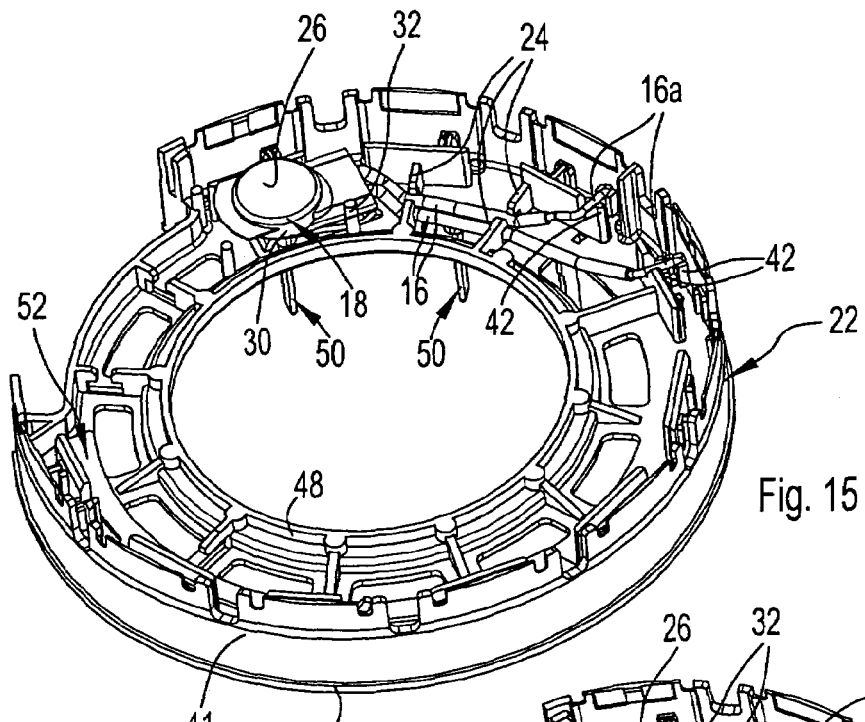
Fig. 15
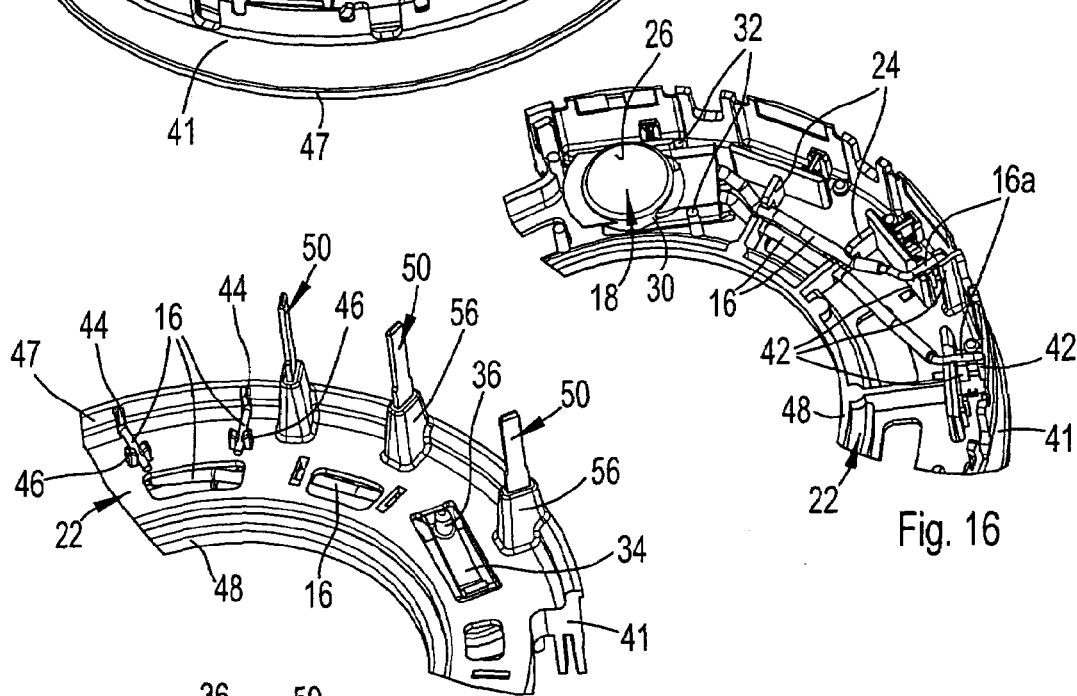
Fig. 16
Fig. 17
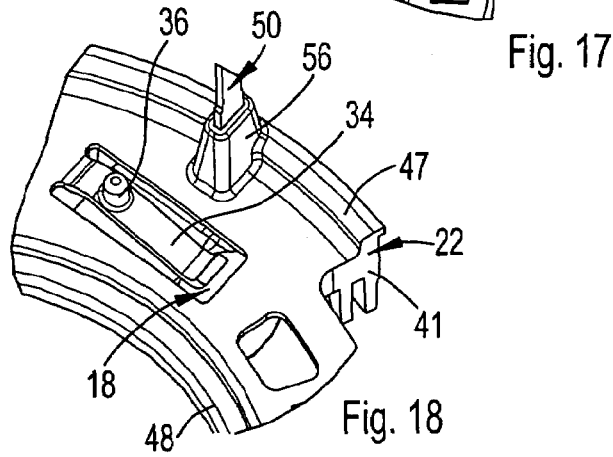
Fig. 18

STATOR FOR AN ELECTRIC MOTOR HAVING A TEMPERATURE MONITOR

CROSS REFERENCE TO RELATED APPLICATIONS

This application claims priority to European patent application number 0 510 4339.6, filed May 23, 2005.

FIELD OF THE INVENTION

The present invention relates to a stator for an electric motor, in particular for an external rotor motor, having a laminated stator core which is provided with a stator winding and having a connecting arrangement. The connecting arrangement is positioned on one end side in the region of an end winding of the stator winding, for the purpose of electrically connecting winding wire ends of the stator winding and connecting wires of a temperature monitor connected upstream of the stator winding.

BACKGROUND AND SUMMARY OF THE INVENTION

A stator of the above general type is described in EP 0 993 095 A1/B1. With this known stator, the laminated stator core has an insulating plastic compound injected around it at both of its end sides and within stator slots, through which the stator winding is wound, the plastic compound forming an end insulation on both sides - in this case "insulating end disks". A receptacle which is integrally formed on the end disk is provided on one side, and a temperature monitor is inserted axially into said receptacle. The temperature monitor, as a fuse element, is connected electrically in series upstream of the stator winding. In order to connect winding wires and connecting wires of the temperature monitor, a connecting arrangement having at least one multiple-contact chamber is provided which is formed by sub chambers on one of the end disks and on an additional wiring plate which is on the end-winding side. Contact elements in the form of insulation displacement contacts are arranged in the contact chambers. The wiring plate has a through-opening in the region of the temperature monitor and has fixing elements on its upper side for the purpose of holding the connecting wires of the temperature monitor in a clamping manner. The known stator is manufactured and mounted by the winding wire ends being guided through in each case one of the contact chambers and by contact being made there with the winding wire ends by insulation displacement contacts being inserted. It is then possible for connecting lines to be pushed into the respective contacts. The temperature monitor is inserted axially into the receptacle of the end disk, and its connecting wires are guided via the wiring plate and fixed there, and the ends of these connecting wires are inserted into corresponding insulation displacement contacts and, as a result, contact is made with said connecting wires.

EP 0 727 864 B1 describes a connecting arrangement for an electric motor, in which connector elements are held on a disk-shaped base part and have in each case one connection lug having a clamping tongue for the respective wire end for the purpose of connecting the stator winding wire ends. In this case, a special accommodating and contact-making arrangement is provided for a button-like temperature monitor which is in the form of a button battery without any connecting lines, this arrangement making it possible to assemble the motor either with or without a temperature monitor. For this purpose, the base part has a receptacle for the temperature monitor with a special contact spring element, by means of which it is possible to make contact either with the temperature monitor inserted into the receptacle or with a connector element to be used in place of the temperature monitor. A hole opening is formed in a bottom wall of the receptacle such that the temperature monitor resting in the receptacle is exposed to the heat of the stator winding through the hole opening, to be precise only indirectly via a contact section of a connector element and possibly via an additional circuit insulation. Thermal transfer is therefore not optimal.

The present invention is based on the object of providing a stator of the type described at the outset which ensures a high degree of reliability in use, with simplified manufacture and assembly.

According to the invention, the temperature monitor is thus held in an integrated manner in an insulating switching disk, which covers, in particular covers in the form of a cap, the region of the end winding such that, on the end-winding side, it rests between the stator winding and the switching disk such that it is in thermally conductive bearing contact with the stator winding. This means that the temperature monitor—preferably together with further contact elements of the connecting arrangement—is held in an integrated manner in the switching disk in preassembled form such that only the switching disk which has been provided in advance in this manner needs to be placed axially onto the wound laminated stator core. In this case, the temperature monitor bears, in direct bearing contact, against the stator winding on the end-winding side, which ensures effective heat transfer and, as a result, a high degree of reliability owing to the fact that the temperature monitor reliably disconnects the motor in the event of overheating.

In one advantageous refinement, the temperature monitor is fixed in the switching disk by means of its connecting wires, for which purpose the switching disk has fixing elements on its stator side facing the end winding for the purpose of accommodating and holding, in a clamping manner, the connecting wires. In addition, a spring-elastic pressure force is preferably applied to the temperature monitor, for which purpose the switching disk has a spring arm, which produces the pressure force, in the region of the temperature monitor. Owing to this advantageous refinement, tolerance compensation is achieved by any dimensional tolerances; in particular tolerances of the installation height of the end winding, being compensated for by the spring-loading of the temperature monitor such that, in any event, effective, direct thermal contact between the temperature monitor and the stator winding is ensured.

In one further preferred refinement, the connecting wires of the temperature monitor are connected directly using insulation displacement technology. For this purpose, the connecting wires are fixed in the switching disk such that contact is made with them automatically in insulation displacement contacts by means of a simple joint connection by the switching disk being placed axially onto the region of the end winding. This results in simple assembly of the stator.

Further advantageous design features will be explained in more detail below.

BRIEF DESCRIPTION OF THE DRAWINGS

The invention will be explained in more detail below with reference to a preferred exemplary embodiment illustrated in the drawing, in which:

FIG. 5 shows a plan view in the arrow direction V shown in FIG. 4,

FIG. 6 shows a cross section in the plane VI - VI shown in FIG. 5 in the region of an insulation displacement contact.

FIG. 7 shows a perspective view of a switching disk according to the invention, to be precise on the side pointing away from the laminated stator core (flange side).

FIG. 8 shows an enlarged detail of the region VIII in FIG. 7.

FIG. 9 shows a perspective view of the other side (stator side) of the switching disk, FIG. 10 shows an enlarged detail of the region X in FIG. 9, FIG. 11 shows a plan view of the switching disk (flange side), FIG. 12 shows a side view of the switching disk in the arrow direction XII shown in FIG. 11, FIG. 13 shows a plan view of the other side (stator side) of the switching disk in the arrow direction XIII shown in FIG. 12, FIG. 14 shows a severely enlarged section in the plane XIV - XIV in FIG. 11, FIG. 15 shows an enlarged perspective view of the stator side of the switching disk in analogy to FIG. 9, and FIGS. 16 to 18 each show a detailed view of the switching disk.

DETAILED DESCRIPTION OF THE INVENTION

Figure 1:
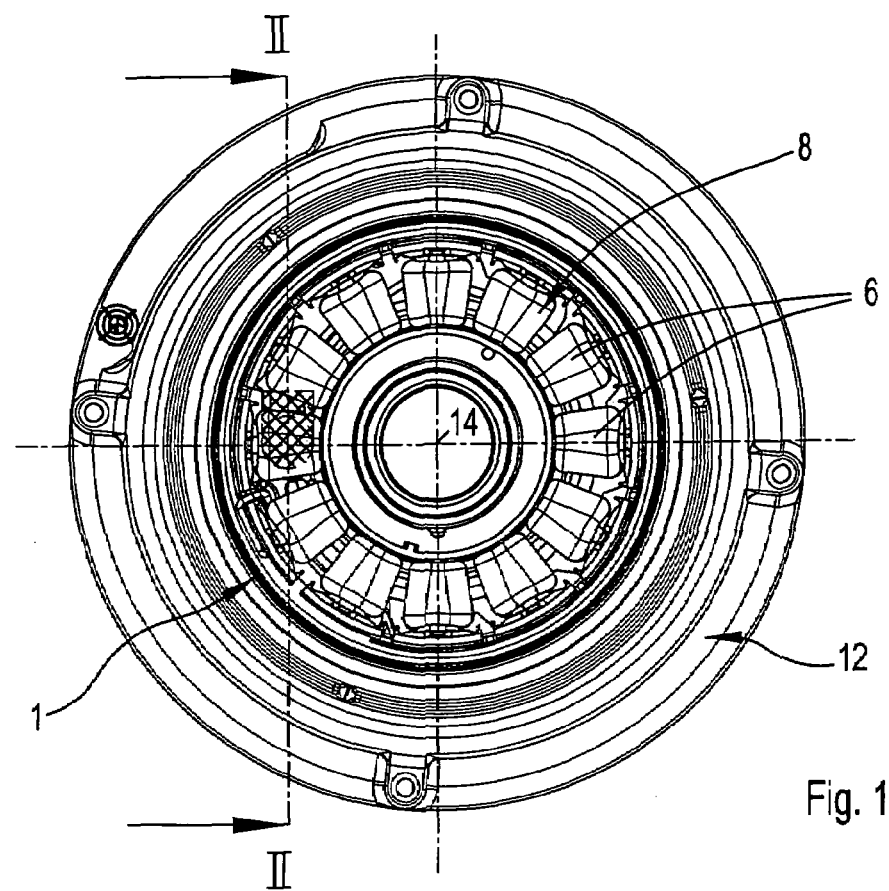
FIG. 1 shows an axial view (plan view in the direction of the motor axis) of a stator according to the invention on its rotor side (rotor not illustrated).
Figure 2:
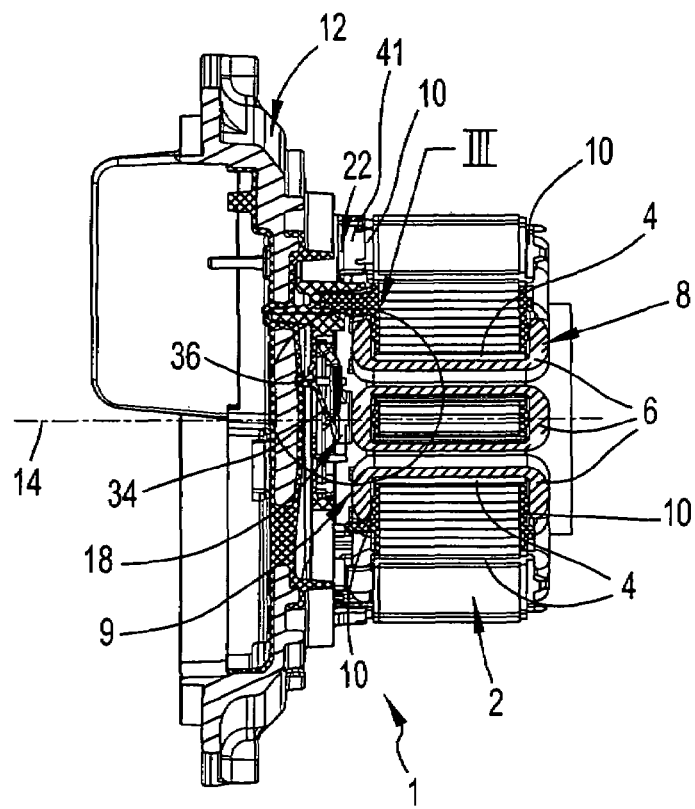
FIG. 2 shows a section in the plane II-II shown in FIG. 1.

In the various figures of the drawing, identical parts are always provided with the same references and therefore generally only need to be described once in each case.

As can be seen initially in FIGS. 1 to 4, a stator 1 according to the invention comprises a laminated stator core 2 having stator slots 4, through which in each case winding elements 6 of a stator winding 8 extend. The laminated stator core 2 comprising layered sheet-metal laminates has an insulating plastic material injected around it at both of its end sides and within the slots. On the one hand, this serves the purpose of insulating the winding elements 6 within the stator slots 4 and, on the other hand, serves the purpose of insulating the so-called end winding 9 in the region of the end sides opposite the laminated stator core 2. This part of the insulation of the region on the end-winding side is in each case an end insulation 10.

The laminated stator core 2, which has had the stator winding 8 wound around it, is fixedly connected on one end side to a motor flange 12. This motor flange 12 extends essentially perpendicularly with respect to a motor axis 14. In the preferred refinement for an electric external rotor motor, the wound laminated stator core 2 is surrounded by a pot-shaped or bell-shaped external rotor (not illustrated) from its other end side, that which is opposite the motor flange 12.

Figure 4:
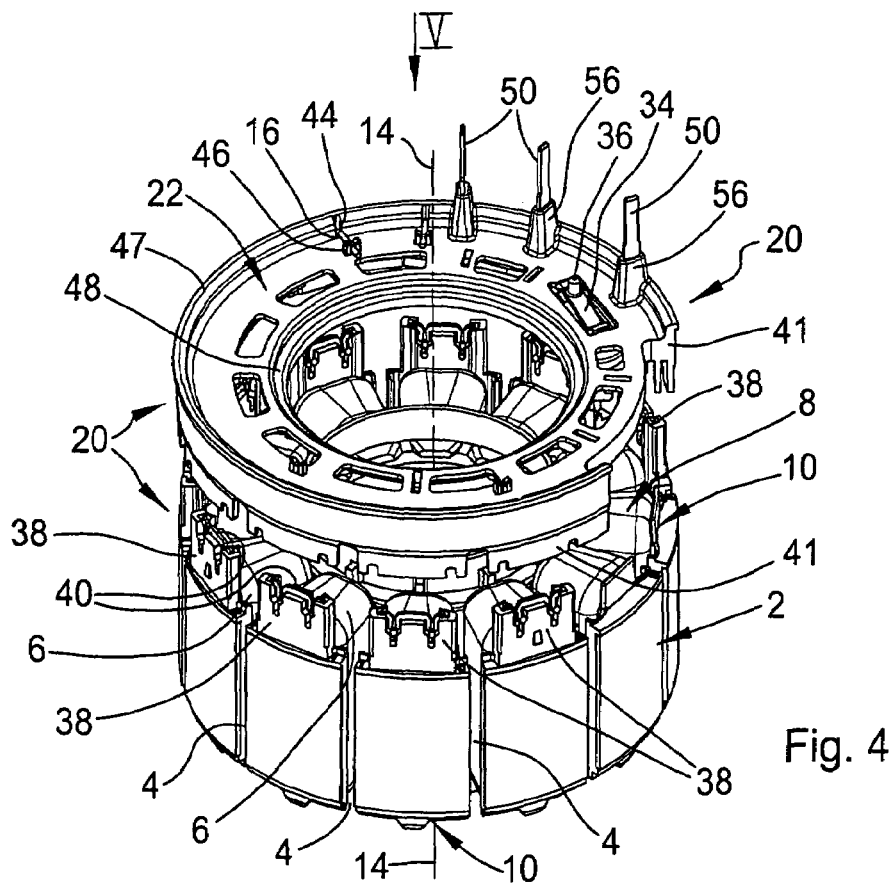
FIG. 4 shows a perspective view of components of the stator according to the invention.

The stator 1 also has a connecting arrangement 20 for the purpose of electrically connecting winding wire ends (not provided with a reference) of the stator winding 8 or the winding elements 6 and connecting wires 16 of a temperature monitor 18, which is connected in series upstream of the stator winding 8 (FIG. 4). This connecting arrangement 20 is arranged on the side of the motor flange 12 between the motor flange 12 and the wound laminated stator core 2.

According to the invention, the connecting arrangement 20 has an insulating switching disk 22 which covers the region of the flange-side end winding 9 of the wound laminated stator core 2, in particular in the form of a cap. The switching disk 22 has a central opening for a motor shaft or for an associated shaft mount (not illustrated), with the result that it is essentially in the form of an annular disk. According to the invention, the temperature monitor 18 is held in an integrated manner in the switching disk 22 such that, on the end-winding side, it rests between the stator winding 8 and the switching disk 22 such that it is in thermally conductive bearing contact with the stator winding 8. In this regard, particular reference is made to the enlarged illustration in FIG. 3.

Figure 3:
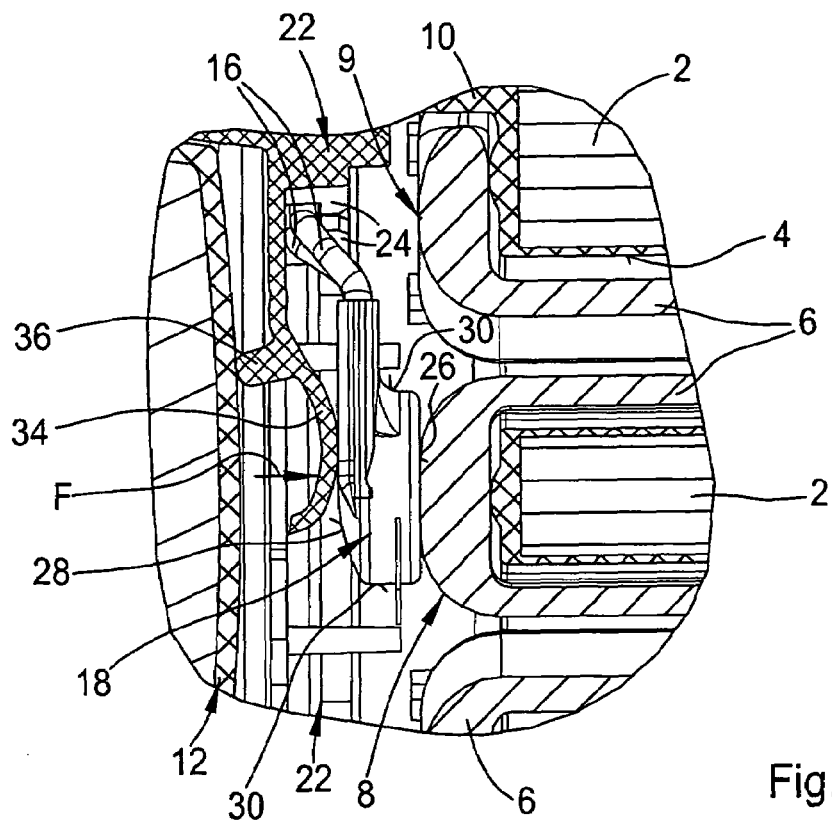
FIG. 3 shows a severely enlarged detailed view of the region III shown in FIG. 2 for the purpose of explaining the arrangement of the temperature monitor.

As can now further be seen in particular in the detailed illustrations in FIGS. 9 to 18, the temperature monitor 18 is fixed in the switching disk 22 by means of its connecting wires 16. For this purpose, the switching disk 22 has fixing elements 24 on its stator side facing the stator end winding 9 for the purpose of accommodating and holding, in a clamping manner, the connecting wires 16. The fixing elements 24 are preferably in the form of clamping receptacles, into which the connecting wires 16 can be inserted or latched easily and quickly in a force-fitting manner. In this regard, particular reference is made to FIGS. 15 and 16. As can further be seen from these figures, the temperature monitor 18 has a flat, button-like shape having opposing bearing faces 26 and 28, which extend approximately perpendicularly with respect to the motor axis 14, and a lateral circumferential edge 30 (cf. in this regard FIG. 3). In this case, the connecting wires 16 leave the circumferential edge 30 with an extent which is essentially parallel to the bearing faces 26 and 28. It can further be seen in FIGS. 15 and 16 that the temperature monitor 18 rests in an accommodating region of the switching disk 22 and is preferably positioned here in the correct position by means of lateral, for example pin-like positioning elements 32 such that it comes to rest directly precisely on the end winding 9 of one of the winding elements 6, as shown in FIG. 3.

In the preferred refinement illustrated, a spring-elastic pressure force F is applied to the temperature monitor 18 in the direction of the stator winding 8. For this purpose, as shown in FIGS. 3, 11, 17 and 18, the switching disk 22 has a spring arm 34, which produces the pressure force F, in the region of the temperature monitor 18. This spring arm 34, as shown in FIG. 18, is formed by an approximately U-shaped cutout in the region of a wall of the switching disk 22. In this case, it is furthermore advantageous if the spring arm 34, on its side pointing away from the temperature monitor 18, has a preferably pin-shaped bearing element 36 for the purpose of bearing in a supporting manner against a flange-side opposing surface (cf. FIG. 3). This is used for increasing the pressure force F.

Electrical connecting contact can be made with the connecting wires 16 of the temperature monitor 18 in principle in any desired manner, for example indirectly by means of additional, for example soldered-on or crimped-on contact elements, such as flat plugs or the like.

In the particularly advantageous embodiment illustrated, however, the connecting wires 16 of the temperature monitor 18 are connected directly using insulation displacement technology. This preferred connecting technique will be explained in more detail below.

The end insulation 10 facing the connecting arrangement 20 has integrally formed accommodating chambers 38 having insulation displacement contacts 40 inserted therein (cf. in particular FIGS. 4 and 6). As shown in FIG. 4, the accommodating chambers 38 with the insulation displacement contacts 40 are arranged on the outer circumference of the laminated stator core 2 such that they are distributed over the circumference, in which case they are open in the axial direction toward the switching disk 22 for contact-making purposes. As shown in FIGS. 15 and 16, the connecting wires 16 of the temperature monitor 18 are fixed to the switching disk 22 such that they are automatically inserted into in each case one of the insulation displacement contacts 40 merely by means of an axial joint connection of the switching disk 22 by being placed on the end insulation 10. For this connection between the switching disk 22 and the end insulation 10, the switching disk 22 has an axially extending circumferential edge 41, which, in regions, covers the axially protruding accommodating chambers 38, as shown in FIG. 4. In this case, the switching disk 22 is expediently also fixed to the end insulation 10 in a force-fitting and/or interlocking manner. As can further be seen in particular in FIGS. 15 and 16, each connecting wire 16 of the temperature monitor 18 with a contact section 16*a*, from which the insulation has preferably been stripped, (cf. in this regard also the enlarged detailed view in FIG. 10) is guided and fixed, in particular freely with a radial extent, and in the form of a link via two supporting points 42. In this case, the arrangement of this free, link-like contact section 16*a* is matched to the position of the associated insulation displacement contact 40 such that the contact connection is formed automatically when the switching disk 22 is positioned. In order in this case to achieve the necessary support for the contact section 16*a* and to prevent said contact section 16*a* from being capable of being deflected when the joint connection is made, the end of each connecting wire 16, as an extension of the contact section 16*a*, is guided through 180°, through an opening 44 in the switching disk 22 (cf. in particular FIGS. 4, 6, 8 and 17) on the opposite flange side of the switching disk 22 which points away from the laminated stator core 2, and is fixed there, preferably in a clamping holder 46 (cf. in particular FIG. 8). In this case, each opening 44 is within the disk region enclosed by the circumferential edge 41, with the result that the connecting wires 16 and their contact sections 16*a* are covered in the radial direction such that they are insulated from the outside. In this case, as shown in FIGS. 4, 7, 8, 14 and 17, it is also advantageous if the switching disk 22 has, on its flange side pointing away from the laminated stator core 2, a circumferential web 47 which is arranged approximately in the axial extent of the circumferential edge 41 in order to shield the wires 16, 16*a* radially on the outside on this side, too. Likewise for the purpose of extending leakage paths (avoiding leakage currents), an annular web attachment 48, which surrounds the central opening and preferably extends toward the stator side, i.e. in the direction of the laminated stator core 2, is preferably formed in the inner circumferential region of the switching disk 22, which is in the form of an annular disk.

In one further refinement, additional contact elements are advantageously held on the switching disk 22, to be precise in particular connection contacts 50 for connection to outer connecting lines (not illustrated) or to a printed circuit board and at least one contact link 52 for the connection between at least two, for example three (as illustrated), connecting points.

These contact elements 50, 52 each have connecting sections 54 in the form of flat plugs such that the connecting sections 54 each engage directly in one of the insulation displacement contacts 40 of the stator end insulation 10. In this regard, particular reference is made to FIG. 6.

The connection contacts 50 are preferably in the form of pins and extend axially and in this case are preferably pressed or injected into the plastic switching disk 22, in regions. In order to provide an effective, secure hold, the switching disk 22 shown in FIGS. 6 and 14 may have extended, integrally formed holding sections 56 for this purpose. As shown in FIG. 13, the contact link 52 is in the form of a flat conductor element which has been inserted precisely in position into a receptacle of the switching disk 22. The contact link 52 may expediently be in the form of a shaped sheet-metal part, the connecting sections 54 each being bent back approximately at right angles in the connection direction. The contact link 52 is inserted into the switching disk 22 precisely in position by, first of all, it bearing with one end against an insertion beveled face 58 and then being pivoted (levered) into the switching disk 22 in the manner of a lever, the beveled face 58 bringing about the precise positioning of the connecting sections 54 in relation to the associated insulation displacement contacts 40.

Contact is likewise made with the winding wire ends (not visible in the figures of the drawing) of the stator winding 8 in the insulation displacement contacts 40. As can be seen in FIG. 6, in each case two insulation displacement contacts 40 can be combined to form a twin contact by means of a connecting web. Each insulation displacement contact 40 has an approximately H-shaped design having a lower winding wire contact and an upper connecting contact. In this case, the winding wire ends of the stator winding 8 are initially guided radially through in each case one of the accommodating chambers 38. Owing to the axial insertion of the respective insulation displacement contact 40, contact is made with the winding wire end. The contacts 40 are then ready for the switching disk 22 according to the invention to be inserted on them, i.e. are ready for the connection between the connecting wires 16 of the temperature monitor 18 and the connecting sections 54 of the further contact elements 50 or 52.

The invention is not restricted to the exemplary embodiments illustrated and described, but also comprises all of the embodiments having the same effect in the sense of the invention.

The invention claimed is:

1. A stator for an external rotor electric motor, having a laminated stator core which is provided with a stator winding comprising a connecting arrangement, which is arranged on one end of an end winding of the stator winding, for electrically connecting winding wire ends of the stator winding and connecting wires of a temperature monitor connected with the stator winding, wherein the connecting arrangement has an insulating switching disk which covers one end of the end winding, in the form of a cap, and wherein the temperature monitor is held by the switching disk such that, on the one end of the end winding, the temperature monitor rests between the stator winding and the switching disk such that it is in thermally conductive bearing contact with the stator winding, wherein a spring-elastic pressure force is applied to the temperature monitor by the switching disk, wherein the switching disk has a spring arm, which produces the pressure force, in the region of the temperature monitor, said spring arm being formed by a U-shaped cutout in the region of a wall of the switching disk;

wherein the spring arm, on its side pointing away from the temperature monitor, has a bearing element for the purpose of bearing in a supporting manner against an opposing surface; and wherein the bearing element is configured to bear in a supporting manner against the opposing surface in order to increase said spring-elastic pressure force applied to the temperature monitor.

2. The stator as claimed in claim 1, wherein the temperature monitor is fixed in the switching disk by means of the connecting wires, the switching disk having fixing elements on its stator side facing the stator end winding for the purpose of accommodating and holding, in a clamping manner, the connecting wires.

3. The stator as claimed in claim 2, wherein the laminated stator core has, on its end side facing the connecting arrangement, an end insulation having accommodating chambers having insulation displacement contacts being aligned axially in the direction of the switching disk and contact sections of the connection wires of the temperature monitor being fixed to the switching disk such that the contact sections are inserted automatically into the insulation displacement contacts by means of an axial joint connection between the switching disk and the end insulation.

4. The stator as claimed in claim 3, wherein the connecting wire of the temperature monitor with its contact section is guided and fixed, in particular with a radial extent, by means of support points.

5. The stator as claimed in claim 3, wherein the end of each connecting wire, as an extension of the contact section, is guided through about 180°, through an opening in the switching disk on the opposite side of the switching disk which points away from the laminated stator core.

6. The stator as claimed in claim 3, wherein the winding wire ends of the stator winding are passed through the accommodating chambers of the stator end insulation, and electrical contact is made with the winding wire ends by means of the respective insulation displacement contact.

7. The stator as claimed in claim 1, wherein the temperature monitor has a flat, button-like shape having opposing bearing faces, which extend approximately perpendicularly with respect to a motor axis, and a circumferential edge, the connecting wires leaving the circumferential edge with an extent which is essentially parallel to the bearing faces.

8. The stator as claimed in claim 1, wherein the connecting wires of the temperature monitor are connected to contact sections using insulation displacement contacts.

9. The stator, in particular as claimed in claim 1, wherein additional contact elements for external connecting lines between at least two connecting points are held on the switching disk.

10. The stator as claimed in claim 9, wherein the additional contact elements have connecting sections in the form of flat plugs such that the connecting sections each engage directly in insulation displacement contacts of the stator end insulation.

11. The stator as claimed in claim 9, wherein pin-shaped and axially extending connection contacts in regions are injected or pressed into the plastic switching disk.

12. The stator as claimed in claim 9, wherein a contact link is in the form of a flat conductor element, which has been inserted in position into a receptacle of the switching disk and is preferably made from a sheet-metal material, with connecting sections which are each bent back approximately at right angles.

* * * * *